United States Patent [19]
Fischler et al.

[11] Patent Number: 5,628,704
[45] Date of Patent: May 13, 1997

[54] DRIVE SYSTEM HAVING MULTI-DRIVE PLATE

[76] Inventors: Richard Fischler, 168-01 12th Ave., Apt. 7A, Whitestone, N.Y. 11357; James D. McCusker, 176 Williamson Rd., Bergenfield, N.J. 07621

[21] Appl. No.: 695,708

[22] Filed: Aug. 12, 1996

Related U.S. Application Data

[63] Continuation of Ser. No. 340,281, Nov. 15, 1994, abandoned.

[51] Int. Cl.⁶ .................................. F16H 7/12; F16H 7/20
[52] U.S. Cl. .................. 477/5; 477/6; 477/8; 477/13; 477/14; 474/87; 474/138; 474/150
[58] Field of Search ........................... 477/5, 6, 8, 13, 477/14; 474/87, 117, 138, 150

[56] References Cited

U.S. PATENT DOCUMENTS

| | | | |
|---|---|---|---|
| 1,665,742 | 4/1928 | Kingston | 477/14 X |
| 1,976,925 | 10/1934 | Chryst | 477/14 X |
| 1,988,922 | 1/1935 | Stephenson | 477/14 |
| 2,132,824 | 10/1938 | Kindt | 477/13 X |
| 2,650,505 | 9/1953 | Vannatta | 474/138 X |
| 2,809,535 | 10/1957 | Hein et al. | 477/13 X |
| 3,054,299 | 9/1962 | Procter | 474/138 |
| 3,401,571 | 9/1968 | Searle | 477/8 X |
| 3,413,866 | 12/1968 | Ford | 474/138 |
| 4,015,182 | 3/1977 | Erdman . | |
| 4,031,761 | 6/1977 | Fisher et al. | 474/87 X |
| 4,169,360 | 10/1979 | Shimizu . | |
| 4,172,367 | 10/1979 | McCusker . | |
| 4,217,764 | 8/1980 | Armbruster . | |
| 4,394,818 | 7/1983 | Brownfield et al. . | |
| 4,459,123 | 7/1984 | Tatsunaka et al. | 474/87 |
| 4,509,629 | 4/1985 | Pajgrt et al. | 477/8 X |
| 4,551,986 | 11/1985 | Anderson et al. . | |
| 4,559,910 | 12/1985 | Tsuchiyama et al. | 474/87 X |
| 4,728,318 | 3/1988 | Henderson | 474/117 X |
| 4,736,597 | 4/1988 | Anderson et al. . | |
| 4,787,214 | 11/1988 | Stillwell . | |
| 4,811,569 | 3/1989 | Welch et al. . | |
| 4,854,921 | 8/1989 | Kumm | 474/138 X |
| 4,856,291 | 8/1989 | Takahashi . | |
| 5,046,326 | 9/1991 | Havemann et al. . | |
| 5,048,302 | 9/1991 | Hagenlocher et al. . | |
| 5,222,373 | 6/1993 | Waldschmidt . | |
| 5,224,552 | 7/1993 | Lee et al. | 474/150 X |
| 5,314,386 | 5/1994 | Eide et al. | 474/150 X |
| 5,399,125 | 3/1995 | Dozier | 474/117 |

FOREIGN PATENT DOCUMENTS

| 21038 | 1/1981 | European Pat. Off. | 477/5 |
|---|---|---|---|

OTHER PUBLICATIONS

Beuch, W.E. "Quick Release Belt Tightening Device," IBM Technical Disclosure Bulletin, vol. 14 No. 9 (Feb. 1972), p. 2699. S2756/0077.

*Primary Examiner*—Charles A. Marmor
*Assistant Examiner*—Nathan O. Jensen
*Attorney, Agent, or Firm*—Graham & James LLP

[57] ABSTRACT

A drive system for driving at least one and preferably, a plurality of driven components. The drive system includes a multi-drive plate for securedly mounting and accurately positioning a plurality of drive system components on a single support structure. The drive system also has a single drive belt for being driven by at least one driving member. The multi-drive plate supports and aligns pulleys connected to the driving member and the driven component so that the single drive belt drives at least one driven component. The driving device may include a clutch for allowing the drive system to be driven by a main driving device or by an auxiliary drive device. The driving device and the at least one driven component are mounted on the same side of the multi-drive plate. The pulleys attached to the driving device and the at least one driven component and the serpentine belt are mounted on another side of the multi-drive plate so that the serpentine belt is easily accessible. The single serpentine belt is provided with a spring-mounted tension pulley for maintaining a desired tension in the belt.

19 Claims, 4 Drawing Sheets

DRIVE SYSTEM HAVING MULTI-DRIVE PLATE

This is a Continuation Application of U.S. patent application Ser. No. 08/340,281, filed Nov. 15, 1994 which is now abandoned.

BACKGROUND OF THE INVENTION

The present invention relates to a drive system for driving at least one and preferably, a plurality of components, and more particularly to a drive system having a multi-drive plate for securedly mounting and accurately positioning a plurality of drive system components on a single member. The present invention also relates to a drive system having a single drive belt for being driven by at least one driving member and a multi-drive plate for supporting and aligning the driving member and the driven component.

Conventional drive systems for driving a plurality of driven components, such as alternators, generators, compressors, evaporators, hydraulic pumps, water pumps, fans, etc. typically use a driving motor connected to the driven components via several belts and a plurality of pulleys on the driven components. Usually, most, if not all of the driven components and driving motor are connected and supported by separate support members. The conventional drive systems may also include an auxiliary or supplemental driving device, such as an electric motor, for independently driving the driven components. The auxiliary driving device may be supported by a separate support member.

There are several disadvantages associated with the conventional drive systems described above. First, the construction of such a drive system is complicated because each of the plurality of belts must be mounted on a plurality of pulleys. Then, each of the belts must be properly tensioned and adjusted. Any one of these belts can break due to wear or become loosened during operation of the drive system. Also, the desired tension in each of the belts is difficult to maintain and frequent adjustment of the tension of the belts is necessary.

The plurality of pulleys and belts used to connect driven devices to a driving device requires an elaborate frame for supporting the drive system. The mounting of the driven components and driving members usually requires the use of brackets, struts, braces, etc. Such support structures increase the difficulty in assembling the conventional drive systems and often prevent access to the belts. Therefore, the support structures may have to be removed to service the belts or other components. In addition, because the driven components are mounted via independent mounting devices and vibrate at different frequencies, a separate vibration damping member is usually required for each driven component and driving member which increases costs and assembly time. Also, the driven components are often installed on both sides of the belts where access to the belts is obstructed so that replacement of the belts requires removal of some of the driven components. Further, the complicated mounting of the driving devices and driven components makes it difficult to align the pulleys of each of the driving devices and driven components.

Thus, there exists a need for a more easily accessible drive system for driving at least one driven component without the need for a plurality of driving belts located in between a driving device and the driven component. There is also a need for a drive system that is easier to assemble and repair than conventional drive systems and that can be applied to a variety of different applications.

SUMMARY OF THE INVENTION

It is an object of the present invention to provide a drive system which overcomes the disadvantages of conventional drive systems discussed above.

It is another object of the present invention to provide an improved drive system including a support member for supporting and aligning at least one driving device and driven device.

It is a further object of the present invention to provide an improved drive system having only a single drive belt for driving a plurality of driven components, wherein the single drive belt can be easily and quickly replaced and is maintained at a constant tension.

An additional object of the present invention is to provide a drive system for driving a plurality of driven components in a wide variety of installations such as a self-contained truck refrigeration unit, an air conditioning unit for a building, stand-alone power plants used in marine and remote area environments, and other systems. In addition, the drive system can be adapted to drive the plurality of driven components, as well as, keep a vehicle engine and battery warm during the winter so that vehicle engine starts are easy and to eliminate the need to keep the vehicle idling to keep the engine warm and the battery charged.

The drive system according to a preferred embodiment of the present invention includes a driving device such as a motor for driving at least one driven component. The driving device is a main driving device and may preferably be a diesel engine, a gasoline engine, a natural gas powered engine, an electric motor or other suitable driving device.

In addition, an auxiliary driving device for driving the at least one driven component may be provided for various uses such as a standby or back-up power source to be used when the main driving device is not operating and for other functions. It is preferred that the auxiliary driving device comprises an electric motor that is powered by a standard power source, such as a 220 Volt power source. The auxiliary driving device can be provided with a plug for connecting the auxiliary driving device with the standard power source.

If the auxiliary driving device is provided in the drive system, a clutch is preferably provided on a drive shaft of the main driving device. The clutch is used to engage a drive pulley mounted on the main driving device as desired. The clutch allows for disengagement of the main driving device to allow the drive system to be driven by the auxiliary driving device.

The clutch mounted on the driving shaft of the main driving device may comprise a conventional mechanical centrifugal clutch. However, it is preferred that the clutch comprise a relatively inexpensive, electromagnetic clutch which is adapted to be used with the inventive drive system. This type of inexpensive, electromagnetic clutch can be used with the inventive drive system because the drive system has a multi-drive plate for supporting a clutch field coil in a precise relationship with other clutch components.

The electromagnetic clutch is mounted on a machined shaft which is connected to a driving shaft of the main driving device. An electromagnetic field coil is mounted on the multi-drive plate and centered precisely within a clutch rotator pulley. The clutch rotator pulley freely rotates and is not driven until the electromagnetic clutch field coil is activated to move the clutch drive plate into contact with the clutch rotator pulley to thereby drive the clutch rotator pulley and the at least one driven component.

The electromagnetic clutch is adapted to be engaged and disengaged at any speed and can be incorporated as a safety device to instantaneously stop driving of the driven components by disengaging the main driving device. The electromagnetic clutch field coil is attached to a controller such as an oil pressure switch for automatic operation of the electromagnetic clutch or a control device that delays activation of the clutch until a predetermined speed of the main driving device has been reached.

If an auxiliary driving device is not included in the drive system, the electromagnetic clutch on the drive shaft of the main driving device is unnecessary and can be omitted. An auxiliary or dummy pulley may be provided at a location corresponding to the location where the auxiliary driving device would be mounted so that an auxiliary driving device can be provided in the drive system at a later date. The auxiliary or dummy pulley can be adapted to function as an idler pulley.

The drive system also includes at least one, and preferably a plurality of driven devices such as compressors, fans, generators, alternators, hydraulic pumps, water pumps, and other suitable driven devices. Each of the driven devices has a shaft and a pulley mounted at an end of the shaft so that the driven devices can be powered by the main and/or auxiliary driving devices. The compressors and pumps preferably have a clutch, for example an electromagnetic clutch, for precise control of the driven components and to disengage these components during start-up of the driving device or as required.

The drive system further comprises a single drive belt that is driven by either the main driving device or the auxiliary driving device and is in contact with each of the pulleys of the driven devices and dummy pulleys. The single belt is arranged in a serpentine manner along the main and auxiliary driving devices and the driven devices. The serpentine arrangement of the belt allows a plurality of devices to be driven, as is known in automotive applications, for example.

The single serpentine belt is preferably tensioned by at least one tension pulley which is spring mounted so as to provide a constant, desired tension on the single serpentine belt. The tension pulley eliminates the need for adjusting the tension of the single serpentine belt. The spring-mounted tension pulley can be moved to a non-tensioning position by manually applying a force sufficient to overcome the force of the spring. Once the tension pulley is moved to the non-tensioning position, the single serpentine belt slips off of the drive system and can be easily replaced. After a new belt is inserted on the various pulleys, the tension pulley is released to the tensioning position to again provide a desired tensioning force on the single serpentine belt.

Support for the drive system is provided by a machined multi-drive plate. Each of the main and auxiliary driving devices, the driven devices, the tension pulley and any dummy pulleys are mounted on the machined multi-drive plate and are thereby supported as an integral unit. The multi-drive plate allows each of the pulleys of the driving devices and driven devices and the tension and dummy pulleys to be accurately aligned relative to each other on the same side of the multi-drive plate so that the single serpentine belt moves along the pulleys in a straight path. The main and auxiliary driving devices and the driven devices are mounted on the same side of the multi-drive plate but on a side of the multi-drive plate that is opposite to the side of the multi-drive plate on which the pulleys and belt are mounted. The drive shafts of each of the main and auxiliary driving devices and the driven devices extend from the driving devices and the driven devices on the same side of the multi-drive plate through holes formed in the multi-drive plate to the other side of the multi-drive plate. Because the serpentine belt, the pulleys of the driving devices and the driven devices and the tension and dummy pulleys are located on the same side of the multi-drive plate, the serpentine belt is easily accessible to allow the serpentine belt to be replaced very quickly.

The serpentine belt can easily be replaced by moving the tensioning pulley to a non-tensioning position. The serpentine belt then slips off of the pulleys of the drive system and a new serpentine belt can be installed in seconds. The tensioning pulley is then moved to a tensioning position and the drive system is ready for operation.

The multi-drive plate eliminates the need for a plurality of separate mounting and support devices for each of the driving and driven components. Also, since each of the driving and driven components are mounted on a single support as an integral unit, the drive system vibrates as a unit at a single frequency. Thus, only one vibration damping structure is needed for the entire drive system.

The multi-drive plate can be modified to add or remove driving devices, driven components, tension pulleys, and dummy pulleys, as needed. This allows the drive system to be used in a wide variety of applications.

The drive system of the present invention requires fewer parts, weighs less, is easier to assemble and service and requires less space than conventional drive systems. The weight and space requirements of the inventive drive system are substantially reduced because only one drive belt is required and the plurality of mounting members and vibration dampening devices required in conventional drive systems are unnecessary.

Other features and advantages of the present invention will become apparent from the following description of the invention which refers to the accompanying drawings.

Figure 1:
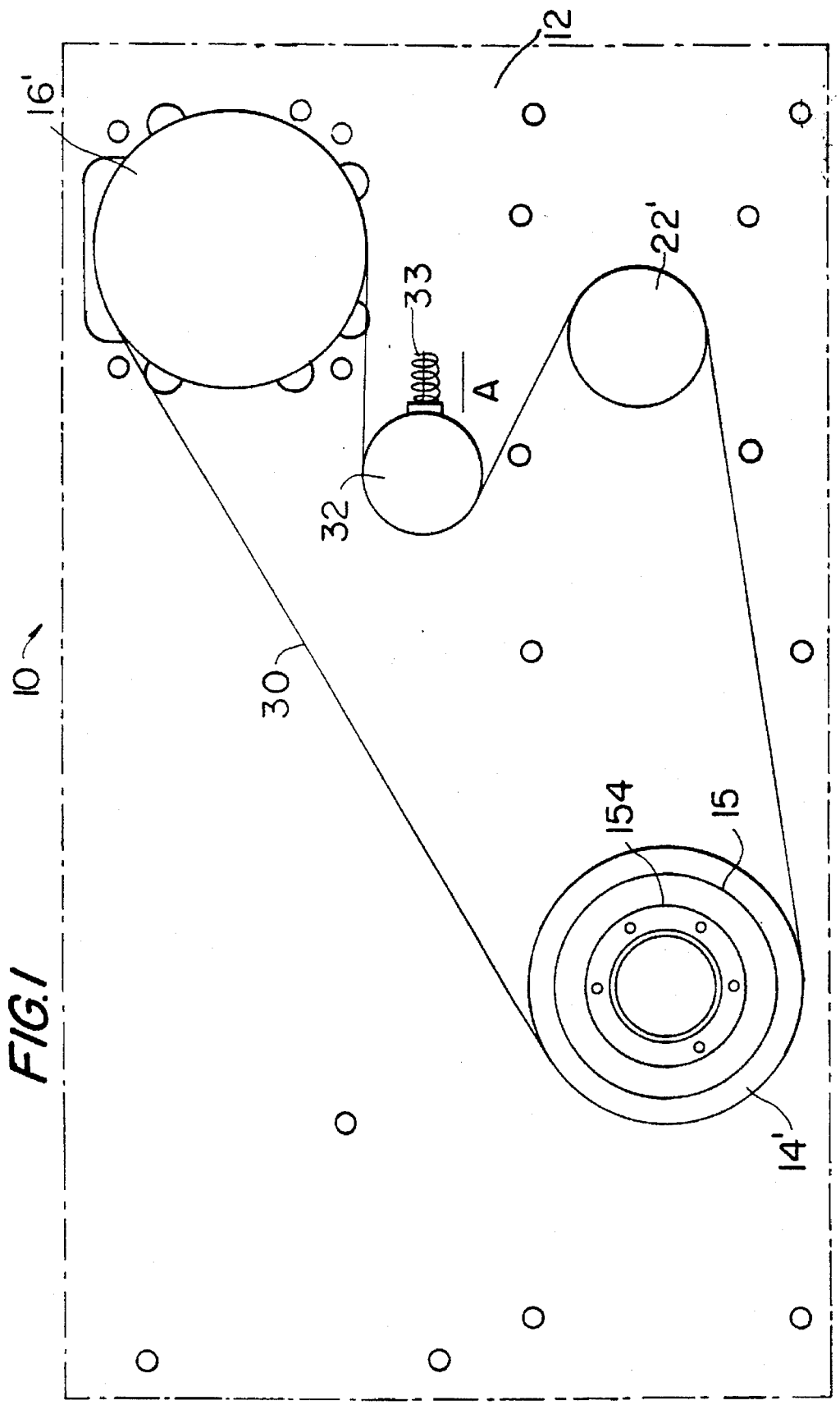
FIG. 1 is a schematic view of a drive system according to one embodiment of the present invention.

For the purpose of illustrating the invention, there is shown in the drawings a form which is presently preferred, it being understood, however, that the invention is not limited to the precise arrangements and instrumentalities shown.

DETAILED DESCRIPTION OF PREFERRED EMBODIMENTS

Figure 2:
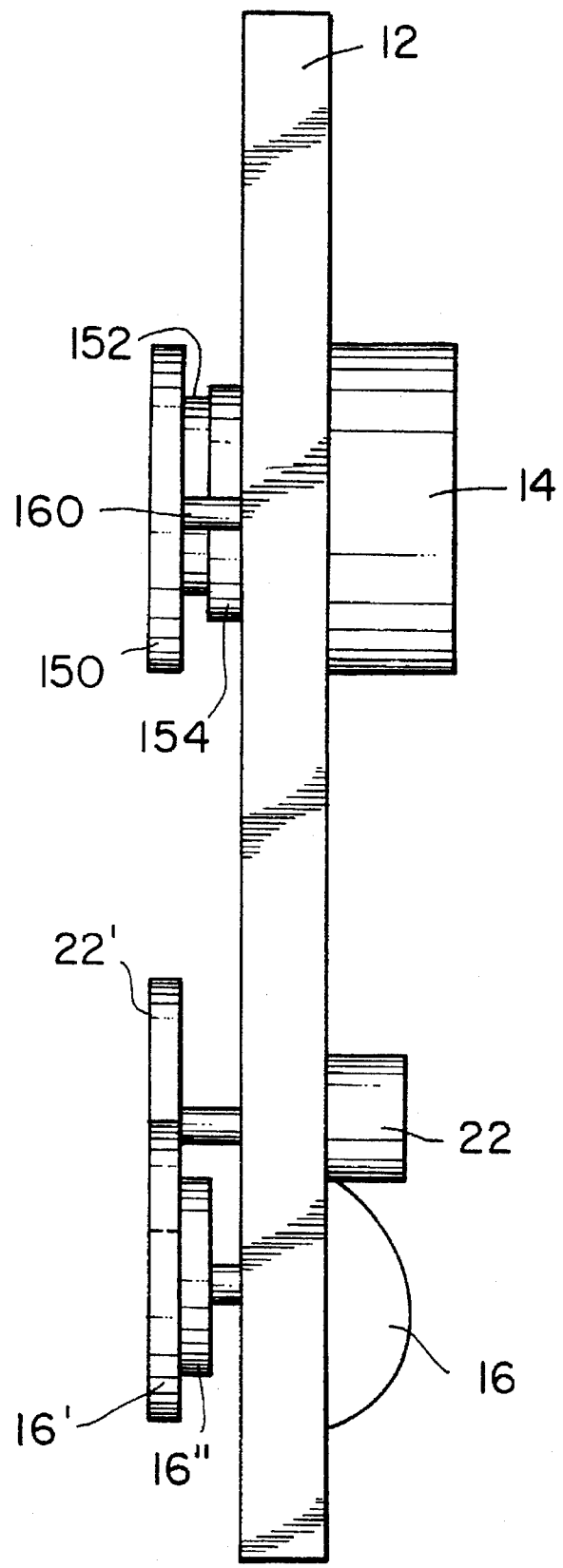
FIG. 2 is a top view of the drive system shown in FIG. 1 with the single drive belt omitted for clarity.

A preferred embodiment of a drive system 10 is shown in FIGS. 1 and 2. The drive system 10 preferably includes a machined multi-drive plate 12 for mounting at least one driving member and at least one driven member to be described below. The multi-drive plate 12 containing the driving and driven members is installed as a unitary drive system in a frame for a unit such as a self-contained truck refrigeration unit, for example. Vibration dampening members (not shown), such as rubber cushions, may be located between the drive system 10 and the unit frame to prevent vibration from being transmitted from the drive system to the unit.

The drive system 10 includes a main driving device 14 in the form of an engine powered by diesel fuel, gasoline, natural gas, electricity, etc. mounted on and attached to the multi-drive plate 12. The drive system 10 may also include an auxiliary driving device 22 in the form of an electric motor, for example. The drive system also includes at least one driven component 16 comprising at least one of a compressor, fan, generator, alternator, hydraulic pump, water pump, and other suitable driven devices. It is preferable that the drive system 10 have a plurality of driven components 16 mounted on the multi-drive plate 12 and driven by the drive system 10.

The driven member 16 shown in FIG. 2 is a compressor for a self-contained truck refrigeration unit. The compressor has a pulley 16' mounted on a shaft that extends from the compressor 16 through the multi-drive plate 12. The compressor 16 also includes an integral clutch 16" for engaging and disengaging the compressor with the rest of the drive system 10 to control temperature and as a safety device when a compressor pressure falls outside of an acceptable range. The clutch 16" is preferably an electromagnetic clutch that can be activated at any time to engage or disengage the compressor pulley 16' with the drive system 10 for controlling temperature, as a safety device and as desired for other reasons. For example, activation of the compressor 16 may be delayed by a suitable controller until the main driving device 14 has reached a predetermined speed.

A plurality of other driven components can also be mounted on the multi-drive plate 12 as required and in a manner similar to the mounting of the compressor 16. Each of the plurality of driven components are driven by a single drive belt to be described later.

A drive pulley 14' for the main driving device 14, a drive pulley 22' for the auxiliary driving device 22 and a drive pulley 16' for the driven member 16 are shown in FIGS. 1 and 2. The drive pulleys 14', 16' and 22' are mounted on the multi-drive plate 12 in such a way that allows the pulleys 14', 16' and 22' to be precisely aligned with each other so as to be driven by the single drive belt. The size of each of the drive pulleys can be selected so that the main driving device 14 and auxiliary driving device 22 can be operated at an optimum speed while accommodating a required speed of a driven component, such as a generator to be operated at 1800 r.p.m. or 3600 r.p.m. while the main driving device is allowed to operate at an optimum speed of 2400 r.p.m., for example.

Each of the main driving device 14, the auxiliary driving device 22 and the plurality of driven members 16 are located behind the multi-drive plate shown in FIG. 1 as seen in FIG. 2. A drive shaft for each of the above devices extends from the other side of the multi-drive plate 12 (the right hand side in FIG. 2) where the main driving device 14, the auxiliary driving device 22 and the plurality of driven members 16 are located through the multi-drive plate 12 to the drive pulleys 14', 16', and 22' located on the outer side of the plate 12 (the left hand side shown in FIG. 2).

Each of the drive pulleys 14', 16' and 22' are engaged by a single drive belt 30 shown in FIG. 1 which is driven by either the main driving device 14 or the auxiliary driving device 22 to drive each of the plurality of driven devices. The belt 30 is arranged on the pulleys of the main and auxiliary driving devices and each of the plurality of driven devices in a serpentine manner which allows the plurality of driven devices to be driven by the single belt 30. The mounting of the main driving device 14, the auxiliary driving device 22 and the driven devices 16 on the multi-drive plate 12 allows the pulleys 14', 16' and 22' to be easily and accurately aligned relative to each other so that the belt 30 can rotate on the pulleys in a single plane without lateral movement of the belt 30 between pulleys 14', 16' and 22'.

The drive system also includes at least one tension pulley 32 for maintaining tension in the driving belt 30. The tension pulley 32 is preferably spring-loaded by a spring 33 to a tensioning position to maintain a desired tensioning force in the belt 30. Because the tension pulley 32 is spring-loaded and maintains the desired tension force in the belt 30, adjustment of the belt tension is unnecessary. The spring loading of the tension pulley is such that the tension pulley 32 can be moved in the direction of arrow A from a tensioning to a non-tensioning position to allow for easy replacement of the belt. More specifically, a manual force can be applied to tension pulley 32 in a direction opposite to the biasing direction of the spring 33 to move the tension pulley 32 to a non-tensioning position. The belt 30 can then be removed from the drive system and a new belt can be mounted thereon in a matter of seconds. The tension pulley 32 is then moved to a tensioning position by removing the manual force and allowing the spring 33 to bias the tension pulley 32.

The auxiliary driving device 22 preferably comprises an electric motor. The pulley 22' for the auxiliary drive device 22 is mounted on a shaft that extends from the auxiliary drive device 22 through the multi-drive plate 12. If the drive system is provided with an auxiliary driving device 22, a clutch 15 is preferably mounted on the shaft of the main driving device 14. The clutch 15 may comprise a mechanical centrifugal clutch or an electromagnetic clutch. An electromagnetic clutch is preferred.

Figure 3:
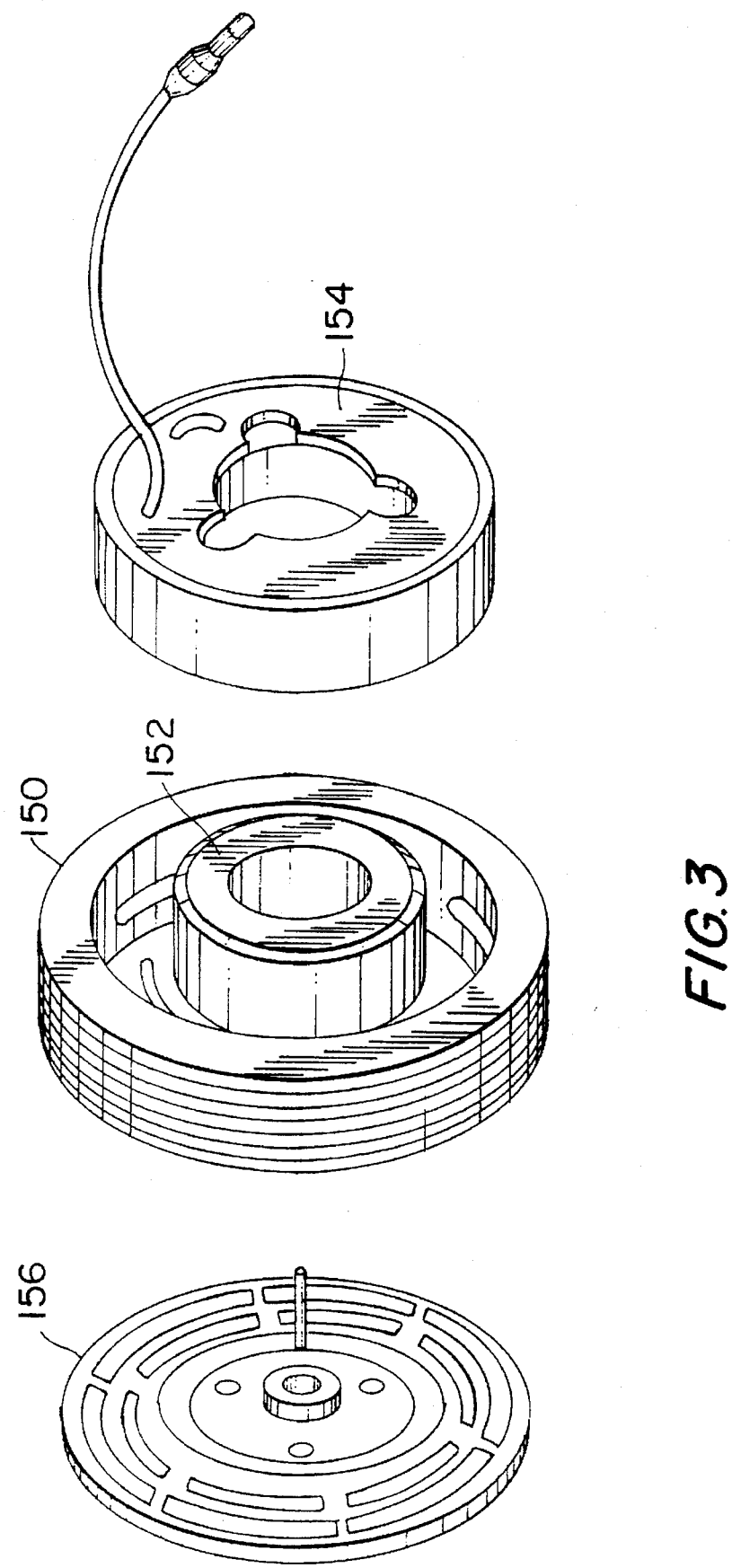
FIG. 3 is a detailed view of a preferred embodiment of an electromagnetic clutch provided in the drive system shown in FIG. 1.

The components of such an electromagnetic clutch 15 are shown in FIG. 3. The clutch includes an electromagnetic field coil 154 which is mounted on the multi-drive plate 12 as shown in FIG. 2 so as to be stationary. The electromagnetic field coil 154 is mounted in such a way as to be precisely centered around a clutch drive shaft 160 shown in FIGS. 2 and 4 which is attached to a drive shaft of the main driving device 14. The electromagnetic field coil 154 is mounted on the multi-drive plate 12 so as to not contact the drive shaft 160.

The clutch drive shaft 160 extends from the main driving device 14 and its driving shaft through the electromagnetic field coil 154 and through a clutch rotator pulley 150. Precise machining of the shaft 160 allows the clutch rotator pulley 150 to be located at a fixed, desired position relative to the field coil 154. The clutch rotator pulley 150 has an integral bearing 152 which is firmly mounted on the drive shaft 160 at a location 162 in such a manner to allow the drive shaft 160 to freely rotate within the pulley 150 without causing the pulley 150 to rotate when the electromagnetic field coil 154 has not been activated.

Also positioned at the end of the clutch shaft 160 is a clutch drive plate 156 in such a manner that the clutch drive plate 156 is spaced from the rotator pulley 150 by a fixed, desired distance. The clutch drive plate 156 can be attracted into contact with the clutch rotator pulley 150 to drive the pulley 150 by the electromagnetic field created when the field coil 154 is energized. The pulley 150 is driven with the drive shaft 160, thereby driving the belt 30.

Figure 4:
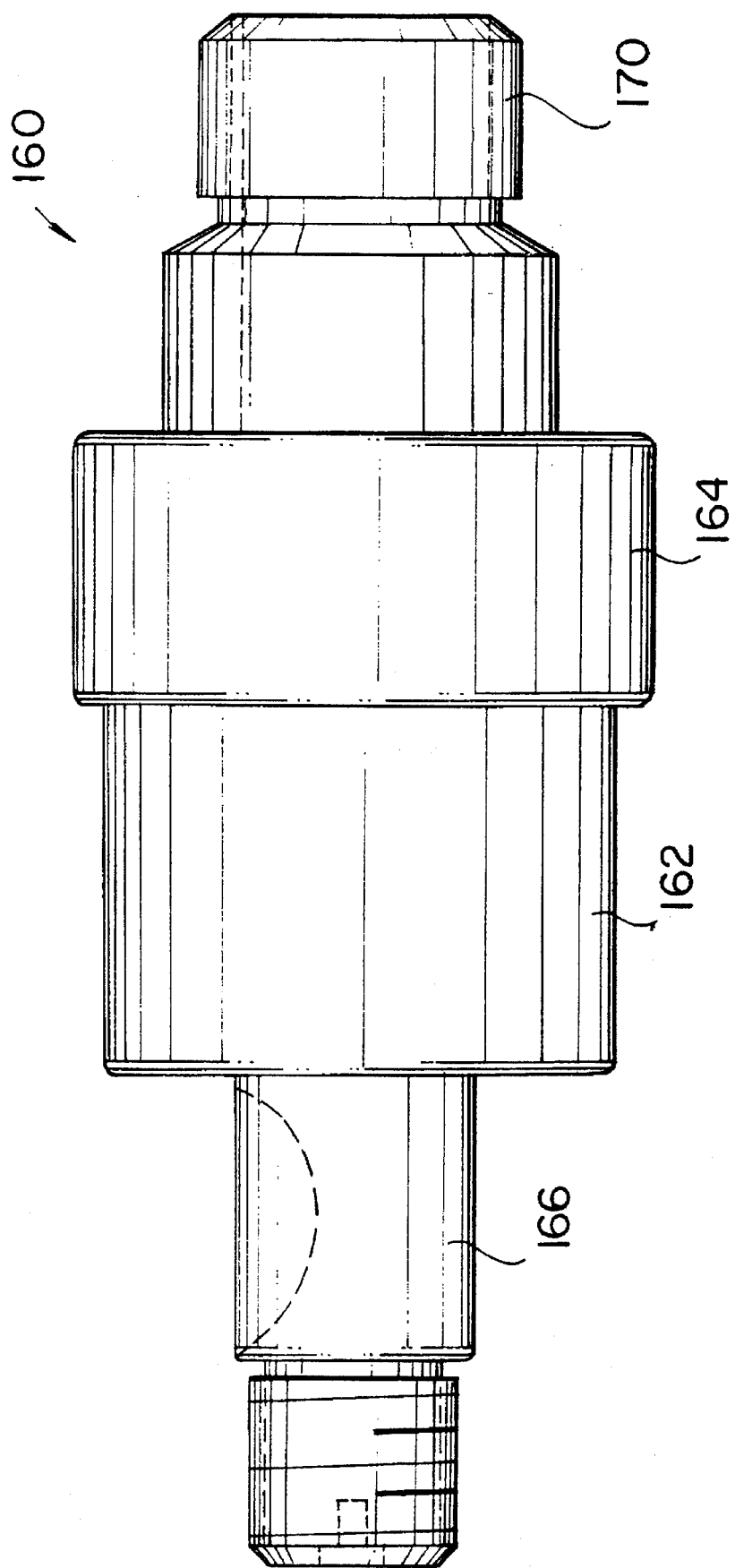
FIG. 4 is a detailed view of a preferred embodiment of a shaft for mounting the clutch shown in FIG. 3.

The clutch shaft 160 is more clearly shown in FIG. 4. The clutch shaft 160 is precisely machined to accept the clutch rotator pulley 150 and integral bearing 152 and the clutch drive plate 156 at desired positions on the shaft 160. The multi-drive plate 12 serves as a unit support structure for supporting the electromagnetic field coil 154 in a desired, fixed position relative to the other components of the clutch assembly which is fixed to the main driving device 14 via the drive shaft 160.

The operation of the clutch 15 is as follows. When the electromagnetic field coil 154 is not activated, the drive plate 156 is spaced from the rotator pulley 150 and the bearing 152 allows the drive shaft 160 to freely rotate within the drive pulley 150 so that the pulley 150 does not drive the belt 30. Upon activation of the electromagnetic field coil 154, the drive plate 156 is drawn into engagement with the rotator pulley 150 so that the pulley 150 is driven at the speed of the main driving device 12 by the drive shaft 160 thereby driving the belt 30.

The field coil 154 can be attached to a controller (not shown) for controlling activation of the clutch 15. The controller can comprise an oil pressure switch for automatically activating the clutch 15 when oil pressure is present in the main driving device 14. Alternatively, the controller may comprise a delay switch that delays activation of the clutch 15 until a predetermined speed of the main driving device 14 has been reached.

If an auxiliary driving device 22 is not provided in the drive assembly, the clutch 15 is unnecessary and can be omitted. A drive pulley can be provided in place of the clutch 15 and attached to the main driving device 14 so that the drive pulley is rotated when the main driving device 14 is operating. In addition, if the drive system is formed without an auxiliary driving device 22, a dummy pulley can be located in its place so that the auxiliary driving device can be added at a later date. Also, the clutch 15 can be easily mounted onto the drive shaft of the main driving device 14 if an auxiliary driving device is added.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A drive system comprising:
   at least one driving device including a first drive shaft and a first drive pulley mounted on the first drive shaft;
   at least one driven component driven by the least one driving device, the at least one driven component including a second drive shaft and a second drive pulley mounted on the second drive shaft;
   a single belt operatively connected to the at least one driving device and the at least one driven member via the first and second drive pulley so that the belt is driven by the at least one driving device to drive the at least one driven component; and
   a single support member supporting the at least one driving device and the at least one driven component, the single support member being arranged such that single belt, the first drive pulley and the second drive pulley are located on a first side of the single support member; and the at least one driving device and the at least one driven component are located on a second side of the single support member and the first and second drive shafts extend through the single support member from the first side to the second side of the single support member, wherein the at least one driving device and the at least one driven component are supported only at said single support member.

2. The drive system of claim 1, further comprising a plurality of driven components mounted on the support member, wherein the support member comprises a machined plate.

3. The driven system of claim 2, wherein the at least one driven component comprise at least one of an alternator, a generator, a compressor, a hydraulic pump, a water pump and a fan.

4. The drive system of claim 1, wherein the at least one driving device and the plurality of driven components are securely mounted on the support member to form an integral unit and so that the pulleys of each of the at least one driving device and the plurality of driven components are aligned relative to each other.

5. The drive system of claim 1, wherein the at least one driving device comprises one of a diesel engine, an electric motor, a gasoline engine, and a natural gas powered engine.

6. The drive system of claim 1, wherein the at least one driving device comprises a main driving device, the drive system further comprising an auxiliary driving device for driving the at least one driven component when the main driving device is not driving the at least one driven component.

7. The drive system of claim 6, wherein the main driving device has a clutch operatively connected thereto for engaging and disengaging a driving force output from the main driving device with the single belt and the at least one driven component.

8. The drive system of claim 6, wherein the auxiliary driving device comprises an electric motor.

9. The drive system of claim 8, wherein the electric motor has a connector for connecting the electric motor to a standard power supply for providing power to the electric motor.

10. The drive system of claim 7, further comprising a controller for controlling operation of the clutch, the controller comprising at least one of an oil pressure switch for automatically activating the clutch when oil pressure is present in the main driving device and a delay device that delays activation of the clutch until a predetermined speed of the main driving device has been reached.

11. The drive system of claim 7, wherein the clutch is adapted to be activated and deactivated at any rotational speed.

12. The drive system of claim 7, wherein the clutch comprises an electromagnetic clutch including a clutch shaft attached to a driving shaft of the main driving device, an electromagnetic field coil, an integral clutch bearing and a pulley mounted on the clutch shaft, the field coil being mounted on the support member, and a drive plate attached to the clutch shaft and being movable into and out of engagement with the clutch pulley upon activation and deactivation of the field coil, wherein when the drive plate is attracted into engagement with the clutch pulley by the field coil, the clutch pulley is driven so as to drive the single belt and the at least one driven component.

13. The drive system of claim 12, wherein the support member is machined to receive the field coil thereon so that the field coil is precisely centered around the clutch drive shaft.

14. The drive system of claim 12, wherein the field coil is attached to the support member.

15. The drive system of claim 1, further comprising at least one tension pulley for maintaining a desired tension in the single belt.

16. The drive system of claim 15, further comprising a spring for biasing the at least one tension pulley into a tensioning position.

17. The drive system of claim 16, wherein the at least one tension pulley is adapted to be moved to a non-tensioning position upon application of a manual force.

18. The drive system of claim 1, further comprising at least one dummy pulley mounted on the support member.

19. The drive system of claim 15, wherein the single belt is disposed in a serpentine arrangement on the at least one driving device, the at least one driven component and the at least one tension pulley.

* * * * *